United States Patent
Wesby et al.

(10) Patent No.: US 9,618,420 B2
(45) Date of Patent: Apr. 11, 2017

(54) SYSTEM AND METHOD FOR A SURFACE STRAIN GAUGE

(76) Inventors: Philip Wesby, Stratford-Upon-Avon (GB); Christopher Turner, Hampshire (GB)

(*) Notice: Subject to any disclaimer, the term of this patent is extended or adjusted under 35 U.S.C. 154(b) by 862 days.

(21) Appl. No.: 13/641,581

(22) PCT Filed: Apr. 12, 2011

(86) PCT No.: PCT/GB2011/000566
§ 371 (c)(1),
(2), (4) Date: Oct. 16, 2012

(87) PCT Pub. No.: WO2011/131922
PCT Pub. Date: Oct. 27, 2011

(65) Prior Publication Data
US 2013/0035878 A1 Feb. 7, 2013

(30) Foreign Application Priority Data
Apr. 19, 2010 (GB) .................................. 1006475.6

(51) Int. Cl.
*G01M 5/00* (2006.01)
*G01B 7/16* (2006.01)
(Continued)

(52) U.S. Cl.
CPC ........... *G01M 5/0083* (2013.01); *F03D 7/042* (2013.01); *F03D 17/00* (2016.05); *G01M 5/0016* (2013.01);
(Continued)

(58) Field of Classification Search
CPC ........ F03D 11/0091; F03D 7/042; F03D 7/04; G01M 5/0016; G01M 5/0033;
(Continued)

(56) References Cited

U.S. PATENT DOCUMENTS 5,700,337 A 12/1997 Jacobs et al. .................... 156/64
5,869,189 A * 2/1999 Hagood, IV .......... H01L 41/082
                                                         310/357

(Continued)

FOREIGN PATENT DOCUMENTS

GB         2 180 940 A      4/1987
WO    WO 2005/043107 A2   5/2005

OTHER PUBLICATIONS

Marco Balice, Authorized officer European Patent Office, International Search Report—Application No. PCT/GB2011/000566, dated Nov. 17, 2011, including the Written Opinion of the International Searching Authority (17 pages).

*Primary Examiner* — Manuel L Barbee
(74) *Attorney, Agent, or Firm* — Sunstein Kann Murphy & Timbers LLP (57) ABSTRACT

A system and method for a surface strain gauge is described which has direct application to wind turbine structures and wind turbine blades and wind turbine struts. The invention is equally applicable to other airfoil structures such as aircraft wings and aircraft fuselages. The strain gauge comprises an array of carbon fiber material integrated with one or more microcontroller modules wherein the entire array may be incorporated into the surface of the structure to be monitored during manufacture of the structure. The array comprises separate sheets of carbon fiber reinforced epoxy which are linked together and which each comprise a separately addressable element such as a microcontroller wherein the microcontrollers are connected to a power supply and to a central bus which itself links to a central system controller. Differential measurements of the resistance of separate carbon fiber reinforced epoxy sheets may be determined in real time as well as the resistance between two or more sheets. In this way real time dynamic load monitoring can be performed and compared with original (Continued)

values determined at time of manufacture to provide data on fatigue of the structure with time before damage and failure occurs.

22 Claims, 3 Drawing Sheets

(51) Int. Cl.
   *F03D 7/04* (2006.01)
   *F03D 17/00* (2016.01)
(52) U.S. Cl.
   CPC ..... *G01M 5/0033* (2013.01); *F05B 2270/331* (2013.01); *F05B 2270/332* (2013.01); *F05B 2270/808* (2013.01); *Y02E 10/722* (2013.01); *Y02E 10/723* (2013.01); *Y02P 70/523* (2015.11)
(58) Field of Classification Search
   CPC ............. G01M 5/0083; G01M 5/0008; G01M 5/0025; G01M 5/0041; G01M 5/0075; F05B 2270/331; F05B 2270/332; F05B 2270/808; B29C 70/088; B29C 70/54; B29C 70/882; B29C 70/885; G01N 27/02; G01N 27/04; G01N 27/20; G01B 7/18; H04L 41/08; H04L 41/082; H04L 41/0805; G01L 1/16; G01L 5/167; G01L 5/228

See application file for complete search history.

(56) References Cited

U.S. PATENT DOCUMENTS

| | | | |
|---|---|---|---|
| 5,911,158 A * | 6/1999 | Henderson | G01L 1/16 310/328 |
| 2005/0274201 A1 | 12/2005 | Miyazaki | 73/862.041 |
| 2007/0107527 A1* | 5/2007 | Ogisu et al. | 73/774 |

* cited by examiner

SYSTEM AND METHOD FOR A SURFACE STRAIN GAUGE

BACKGROUND OF THE INVENTION

The invention relates to a system and method for a surface strain gauge, which can provide an intelligent smart surface strain gauge and which has direct application to wind turbine structures and wind turbine blades and wind turbine struts. The invention is equally applicable to other airfoil structures such as aircraft wings and aircraft fuselages.

In particular, the invention teaches a method for making use of the properties of carbon fibre reinforced epoxy to provide the basis of a smart surface strain gauge. According to the invention, the material can be integrated into the surface of a structure in an array comprising separate sheets of carbon fibre reinforced epoxy which are linked together and which each comprise a separately addressable element such as a microcontroller wherein the microcontrollers are connected to a power supply and to a central bus which itself links to a central system controller.

Differential measurements of the resistance of separate carbon fibre reinforced epoxy sheets may be determined in real time as well as the resistance between two or more sheets. In this way real time dynamic load monitoring can be performed and compared with original values determined at time of manufacture to provide data on fatigue of the structure with time before damage and failure occurs.

Continuous carbon fibre is easily incorporated into composite structures and so allows sensing of both real time strain and cumulative damage covering large sections of the structure and so providing monitoring of the current safety of the structure with a statistically high reliability of detection.

Generally, strain gauges are known but these often involve the use of strain sensors such as piezoresistive or piezoelectric sensors. Such sensors tend to degrade the mechanical properties of the composite if added.

Recently the properties of carbon fibre reinforced epoxy have been determined to be ideally suited to being suitable for a strain gauge. Whereas a structure with embedded or attached sensors is only smart in the vicinity of each sensor, if a sheet structure of carbon fibre reinforced epoxy is integrated into the surface of the said structure instead, the sheet offers the capability to act as a smart sensor across the entire surface. The electrical resistance of a short carbon fibre epoxy matrix composite increases reversibly upon tension and decreases reversibly upon compression.

It is towards the creation of an advanced strain gauge system, which has the capability to perform differential dynamic load monitoring through direct addressing of separate surface elements of carbon fibre reinforced epoxy and provide this data to a central system controller and this determine any fatigue of a structure that the current invention is directed.

No systems are presently known to the applicants, which address this market need in a highly effective and economic way.

Further to the limitations of existing technologies used for designs for smart strain gauges, and so far as is known, no optimised system and method for an intelligent dynamic load monitoring strain gauge which has suitable application to airfoil structures such as wind turbines, struts and aircraft wings is presently available which is directed towards the specific needs of this problem area as outlined.

OBJECTS OF THE INVENTION

Accordingly, it is an object of the present invention to provide an improved system and method for a surface strain gauge, which comprises an integrated array of separately addressable sheets of carbon fibre reinforced epoxy which can provide selective and differential measurements of the change in resistance across any sheet or across a plurality of sheets relative to a reference value and thereby provide a means to perform dynamic load monitoring of the surface and thereby determine that fatigue is occurring before damage and failure of the surface occurs.

It is a further object of one embodiment of the present invention to provide a system and method for a surface strain gauge which has direct application to wind turbine structures and wind turbine blades and wind turbine struts and which can be applied to other airfoil structures such as aircraft wings and aircraft fuselages.

It is a further object of one embodiment of the present invention to provide a system and method for a surface strain gauge, which comprises an integrated array of separately addressable sheets of carbon fibre reinforced epoxy which can provide selective and differential measurements of the change in resistance across any sheet or across a plurality of sheets relative to a reference value and thereby provide a means to perform dynamic load monitoring of the surface wherein each separate sheet is connected in series to one or more other sheets and wherein each sheet comprises one or more control points which are controlled by a microcontroller which is connected to a communication bus and to a power line such that differential measurements across one or a plurality of sheets may be determined.

It is a further object of one embodiment of the present invention to provide a system and method for a surface strain gauge, which comprises an integrated array of separately addressable sheets of carbon fibre reinforced epoxy wherein each sheet may comprise a plurality of resistance measurement points such that different resistance measurements may be performed by addressing different resistance measurement points.

It is a further object of one embodiment of the present invention to provide a system and method for a surface strain gauge, which comprises an integrated array of separately addressable sheets of carbon fibre reinforced epoxy wherein each sheet comprises a separate microcontroller which is suitably encased in protective resin or the like and wherein the total system including a communication bus and power line may be integrated into the surface of a structure during the manufacture of the said structure such as into the inner surface of a wind turbine blade or strut made from thermoplastic glass reinforcement material such as Twintex.

It is a further object of one embodiment of the present invention to provide a system and method for a surface strain gauge, which comprises an integrated array of separately addressable sheets of carbon fibre reinforced epoxy (CFRE) wherein each sheet comprises a separate microcontroller and wherein the array of microcontrollers is connected to a communication bus and to a power line and wherein each microcontroller is separately addressable by a central system controller and can be controlled to perform measurements of resistance between separate control points in the total array of CFRE sheets.

It is a further object of one embodiment of the present invention to provide a system and method for a surface strain gauge which can be applied to an airfoil section such as a wind turbine blade and or strut which comprises alternating sheets of carbon fibre reinforced epoxy on the upper and lower surfaces of the airfoil such that differential measurements of deformations of each surface of the airfoil mat be determined in real time.

It is a further object of one embodiment of the present invention to provide a system and method for a surface strain gauge, which can be applied to diverse structures including aircraft, marine vessels, boat hulls, car bodies, bridges, wind turbines, propeller blades, which can perform dynamic load monitoring and allow safe shutdown of moving structures before failure and provide a good prediction of remaining fatigue life.

Other objects and advantages of different embodiments of this invention will become apparent from the description to follow when read in conjunction with the accompanying drawings.

BRIEF SUMMARY OF THE INVENTION

Certain of the foregoing and related objects are readily-attained according to the present invention by the provision of a novel system and method for a surface strain gauge, which serves to address the diverse requirements for developing a system to perform dynamic real time load monitoring of a surface under stress and strain such as an airfoil section of a wind turbine or aircraft. The invention makes use of an array of sheets of carbon fibre reinforced epoxy or carbon fibre epoxy matrix composite each connected to one or more other sheets and each comprising two or more control points. Each sheet comprises a microcontroller or the like which performs measurements of resistance across pairs of control points. The microcontrollers are connected to a communication bus and to a power line and are selectively addressable such that a central system controller can determine changes in resistance across different parts of the structure while the structure is under load. A fuzzy logic algorithm can optimise the analysis of the structure using the smart surface strain gauge according to the invention and thereby determine if fatigue of the structure has occurred relative to the reference values of resistance measured when the structure was manufactured.

Other objects and features of the present invention will become apparent from the following detailed description considered in connection with the accompanying drawings, which disclose several key embodiments of the invention. It is to be understood, however, that the drawings are designed for the purpose of illustration only and that the particular descriptions of the invention in the context of the wind turbine application are given by way of example only to help highlight the advantages of the current invention and do not limit the scope of the invention.

DESCRIPTION OF A PREFERRED EMBODIMENT

Reference will now be made in detail to some specific embodiments of the invention including the best modes contemplated by the inventor for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as defined by the appended claims.

The following description makes full reference to the detailed features, which may form parts of different embodiments as outlined in the objects of the invention. In the following example reference is made to an application to a vertical axis wind turbine while it will be obvious that the surface strain gauge invention is suitably applied to a wide range of structures to perform dynamic load monitoring of their structures. These alternative structures may include marine hulls, car bodies, or bridges or indeed any suitable structure where real time fatigue monitoring is needed and the surface strain gauge technology can be integrated with the surface.

Figure 1:
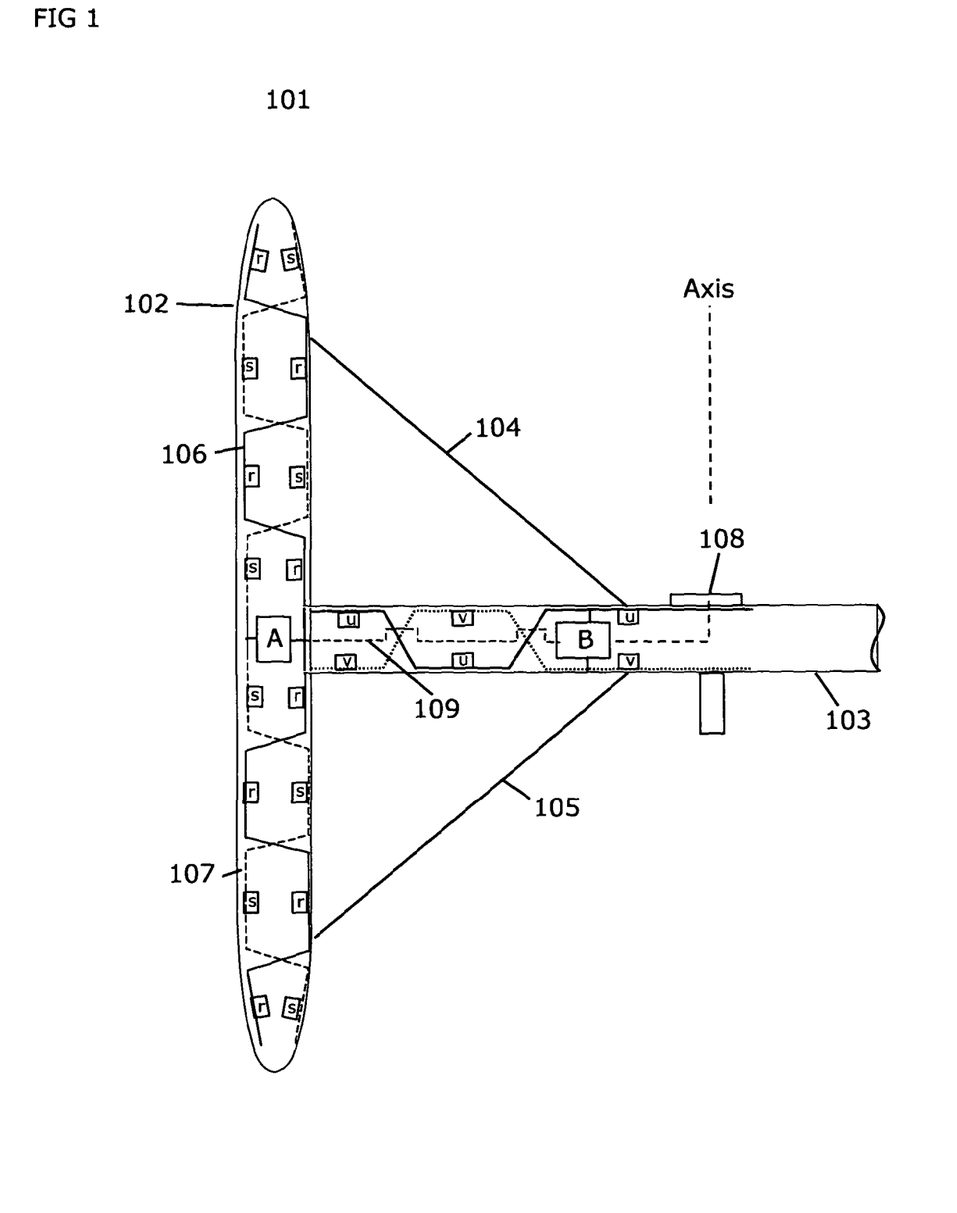
FIG. 1 illustrates a schematic of a strain gauge according to one embodiment of the invention.

Referring now in detail to the drawings and in particular FIG. 1 thereof, therein illustrated is a schematic of a surface strain gauge layout as applied to a vertical axis wind turbine and strut.

In this example, a vertical axis wind turbine blade (102) and horizontal strut (103) comprises two control wires or control struts (104, 105) and rotates around an axis (Axis). The wind turbine may comprise a multi-blade turbine or the end of the strut (103) may comprise a counterweight. The rotating vertical axis wind turbine is subject to forces from the wind as it moves into and out of the direction of the wind as well as centrifugal forces.

By way of example, an arrangement of carbon fibre reinforced epoxy sheets integrated into the strut and the blade is shown. Separate control elements (A, B) are shown controlling the separate sheets in the blade (102) and strut (103) respectively. In the blade, the sheets are organised into an arrangement alternating between the two surfaces of the blade. In this example, the dotted line comprises one arrangement of sheets, each controlled by control elements (s) and the solid line shows a second arrangement of sheets each controlled by one or control elements (r).

Different numbers of control elements may be used according to the structure being monitored and the loading expected.

Similarly, in the strut (103) is shown an arrangement of two alternating sheets arrays wherein the dotted line comprises an arrangement of sheets each controlled by control elements (v) and the sold line shows an arrangement of sheets each controlled by control elements (u). The control elements may comprise microcontrollers, which are linked by a communication and power bus (109). The communication and power bus may be a simple 2-wire circuit with all power and data signals multiplexed on the same wire pair. The power may be provided by a battery and linked to a solar cell and to a radio communications circuit. Via the radio communications circuit, the microcontrollers are able to communicate with an external (non-rotating) controller via a radio link. This external controller logs the strain readings and is able to activate a brake to slow or stop the rotor in the event that dangerous strains or damage occurs.

Each arrangement of sheets forms a resistance, which varies depending on the strain in the skin of the blade. In the blade (102), the two alternating sheet arrays provide data of the loading on the blade at points where the strain is expected to change from compression to tension in the normal highest loading scenario. An alternating array pattern provides a surface strain sensor wherein the changes in resistance determined by one array will be opposite in sense to that determined by the other.

The resistance of the sheet arrays are determined differentially and absolutely with time by one or more microcontrollers. In this example, the microcontroller is able to compute the absolute resistance across different measurement points in the sheet or across several sheets in order to detect absolute increases that may indicate fibre breakage and hence cumulative damage. In order that there are no points in the structure that are not covered for fibre breakage detection, there may be a slight overlap between the different sheet arrays. The microcontroller is also able to compare (by subtraction or ratio in a bridge circuit) the resistance of each loop to the other loop so that the strain induced resistance change can be separated from temperature or other causes of resistance change.

In the case of the wind turbine example, a solar photovoltaic cell and radio communications circuit is shown (108) which connects to the two central control elements (A, B). These two control elements (A, B) connect to a central system controller which manages the algorithm to perform differential determination of the changes in resistance of the carbon fibre reinforced epoxy sheets. Each sheet comprises a plurality of 2 or more measurement points, which are individually addressable by a microcontroller. The control algorithm performs dynamic real time load monitoring of the structure surface by determining real time variations in resistance across a diverse number of pairs of measurement points on the sheets. The control algorithm may use a fuzzy logic self-learning strategy as a function of wind speed and other operational characteristics of the turbine such as rotational speed, tip speed ratio, temperature, variations on wind power and wind direction as determined by sensors on the turbine.

When the wind turbine is in operation, an external central system controller (not shown) will determine the prevailing environmental conditions and will implement the optimum dynamic real time load monitoring strategy to monitor the structure effectively. Over time, the self-learning algorithm will direct its load monitoring strategy to investigate the parts of the structure most under load with higher frequency such as the wind tips as a function of the wind speed and power generated by the wind turbine. The reference resistance values of the sheet arrays are determined when the wind turbine is manufactured. These reference values provide a baseline to determine whether the structure is suffering fatigue with time.

Unidirectional carbon fibre reinforced epoxy has the capability to sense its own strain in the fibre direction, due to its longitudinal electrical resistance decreasing reversibly and its transverse resistance increasing reversibly under longitudinal tension. The strain sensitivity (gauge factor) is very large being more than −30 for the longitudinal resistance and more than +30 for the transverse resistance. This is because the cause of the resistance change is the changes in alignment of fibres and therefore the number of points where they touch rather than any change in a single fibre. Both effects originate from resistance changes associated with the increase in fibre alignment upon longitudinal tension. Either effect allows strain sensing. Any cumulative damage to the fibres (breakage) will also show as a non-reversible change in resistance.

Continuous carbon fibre is easily incorporated into composite structures and so allows sensing of both real time strain and cumulative damage covering large sections of the structure and so providing monitoring of the current safety of the structure with a statistically high reliability of detection.

Most structures when loaded are characterized by having known elements in compression while other known elements are in compression. If the load reverses then the elements may interchange the roles of compression and tension however it is usual that the members can be grouped into 2 sets where members of one set have an opposite role to members of the other set.

Where the members of each set can be identified, the carbon fibre composite sensors of the members may be wired in series to reduce the complexity of the electronics. The series wiring may simply be extending the sensor between elements and the transition is relatively unstressed, or may be by normal conductive wire connected to contacts on the ends of each sensor segment.

Figure 2:
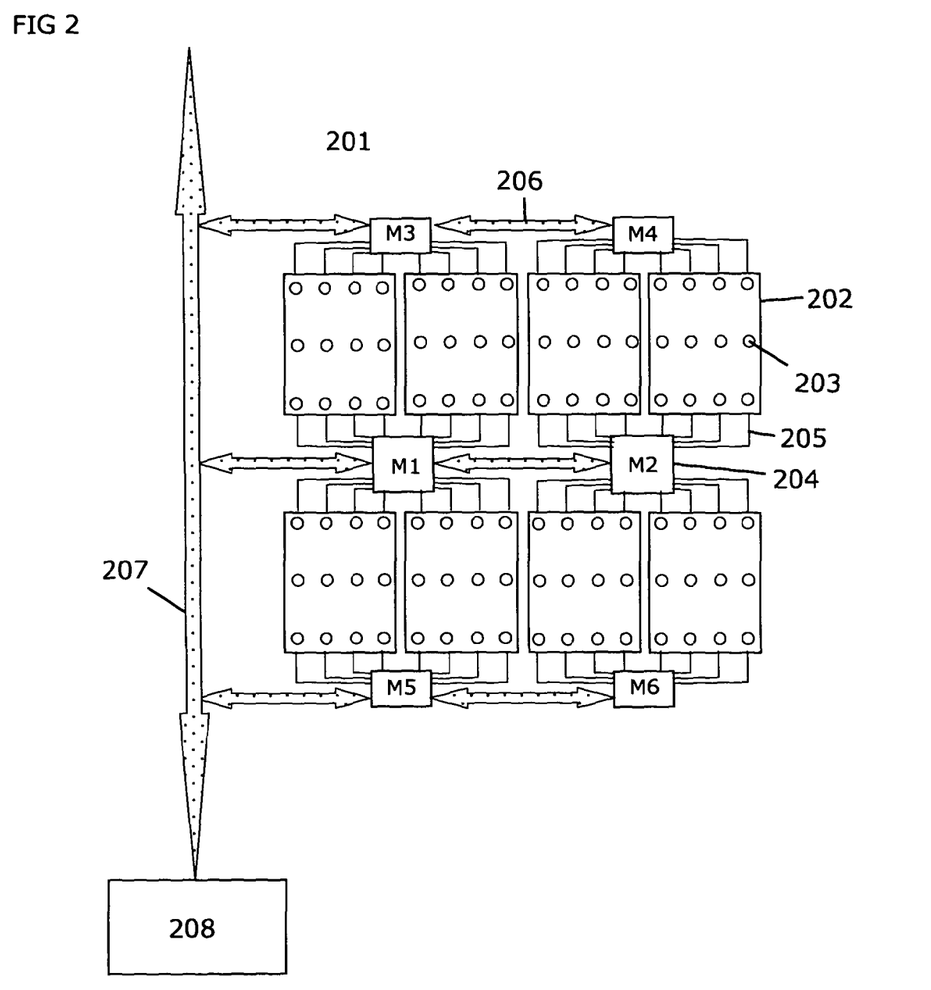
FIG. 2 illustrates a schematic of an example of part of a sheet array controlled by microcontrollers

Now with reference to FIG. 2 is shown a configurative example (201) of how separate sheet elements may be linked together by a number of microcontroller elements and how each may be integrated with a communications and power bus.

In accordance with FIG. 2 are shown eight separate carbon fibre reinforced epoxy sheets (202) wherein each comprises by way of example 12 measurement points (203). Also shown are six separately addressable microcontrollers (204) denoted M1, M2, M3, M4, M5, and M6. Each sheet is associated with at least one microcontroller, which has a plurality of connections with each sheet to perform resistance measurements. A power and communications bus (206) links the microcontrollers together and sends data to and receives data from a central system controller (208) via a central power and communications bus (207).

The central system controller (208) may be remote from the structure and the central power and communications bus (207) may send communications to and receive communications from a wireless communications circuit. Alternatively, the central systems controller (208) is collocated on the structure and the power and communications bus (207) is directly interfaced to it (208). The area density of measurement points and the choice of a geometrical or non-geometrical spacing of the said points and the number of microcontrollers are design choices for the surface strain gauge which are made in relation to the structure being monitored. For example, a single microcontroller for example may be capable of determining the changes in resistance across a large number of measurement points.

Figure 3:
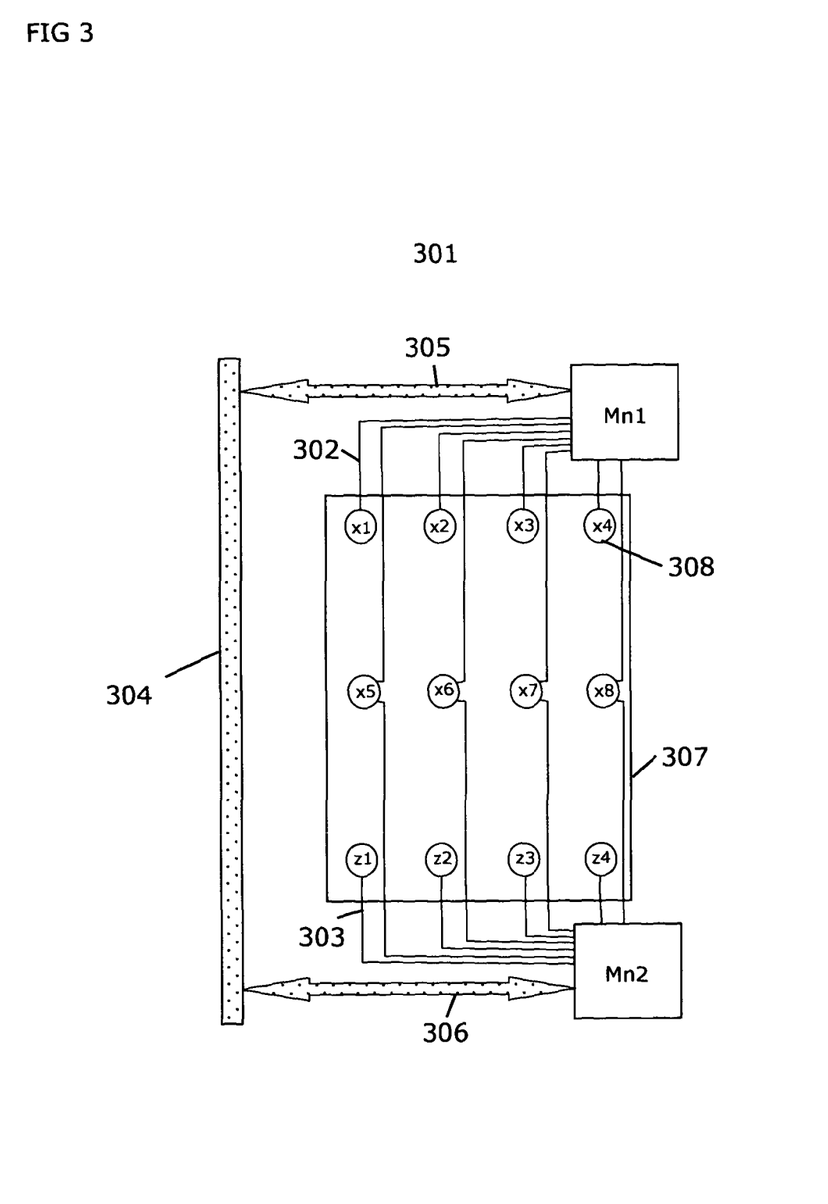
FIG. 3 illustrates a schematic showing an example of how a sheet resistance measurement may be determined.

Now with reference to FIG. 3 is shown a configurative example (301) of a single sheet element in more detail. In this example, two microcontrollers (Mn1, Mn2) connect to a sheet element (307) via a plurality of connections (302, 303) respectively wherein each connection links the microcontroller to a single measurement point (308). In this example, 12 measurement points are shown (x1, x2, x3, x4, x5, x6, x7, x8, z1, z2, z3, z4) and each microcontroller is connected to 8 measurement points for the purpose of performing resistance measurements. The two microcontrollers (Mn1, Mn2) connect via 2 separate communications and power bus connections (305, 306) respectively, which connect to a central communications and power bus (304). As described previously, the area density of measurement points is optimised to perform the optimum dynamic load monitoring of the structure in question.

In general, the invention teaches a system and method for a surface strain gauge and an architecture, which can provide the basis for dynamic differential load monitoring over time and at different resolutions as a function of the density of measurement points used. At very high area density, some structures may be capable of oscillation within the audio frequency range such that the measurements of resistance which are determined at a high enough rate will enable the surface strain gauge according to the invention to also capture sound waves and work as a microphone. The frequency spectrum of the sound waves that may be captured in this way will be limited by the resonant frequency of the material to which the sheets are applied.

The same surface strain gauge method may be applied to the body of a musical instrument and be linked to a microcontroller and be used for tuning the stings of the instrument. Either the surface strain gauge is incorporated into the surface structure of the instrument itself or it is part of a separate element and connects to a structure which can oscillate at particular frequencies. When a note is being tuned, the carbon fibre epoxy material will oscillate with the structure and predetermined resistance levels will be created in the carbon fibre epoxy material. When these resistance levels match those resistances, which correlate with the desired true note as pre-programmed into the microcontroller memory then an associated circuit can cause an event to happen such as issue a sound or cause a LED to light up or the like.

In other applications the surface strain gauge invention is highly suited to integrity monitoring of structures and vessels. For example, ship hulls such as oil tankers suffer fatigue due to the action of the waves on the hulls. In addition the oil storage tanks themselves undergo changes in structural tension when the tanks are filled or are in transit across the sea in rolling waves. In addition, the same surface strain technology may be used to monitor the growth of barnacles in combination with monitoring changes in measured stresses and strains due to barnacle growth and thus identify when the hull must be cleaned. Barnacle growth increases the cost of transport because more fuel is needed to carry a cargo because the ship moves less easily through the water.

In other structural integrity monitoring examples, the invention can provide immediate data on changes in pressurised structures when they are being filled wherein the surface strain gauge technology can provide real time data on distortion and or fatigue of the structures. Tanker vehicles can also benefit from the technology wherein the integrity of the cargo within the tanks, which may be vehicle fuel or other hazardous chemicals can be more safely transported, can be better guaranteed. As tanks age and fatigue, risks of accidents increase and these can be reduced by monitoring fatigue.

The surface strain gauge technology is also applicable to monitor fatigue on any system or structure, which experiences stress and strain. Synthetic heart valves can benefit from this technology by incorporating a layer of carbon fibre reinforced epoxy or a material having similar resistance changing properties into the heart valve itself. The performance of the heart valve can be monitored as well as the fatigue of the heart valve, by monitoring permanent changes of resistance. Patients having synthetic heart valves could benefit from this technology since the integrity of the synthetic heart valves could be better monitored with time.

The surface strain gauge technology when applied to hearts could be linked to a battery or wired through the skin and provide data to an external controller. If appropriate, a wireless connection could transit data between the strain gauge monitoring the heart valve integrity and a data monitoring system.

While only several embodiments of the present invention have been described in detail, it will be obvious to those persons of ordinary skill in the art that many changes and modifications may be made thereunto without departing from the spirit of the invention. The present disclosure is for illustration purposes only and does not include all modifications and improvements, which may fall within the scope of the appended claims.

The invention claimed is:

1. A smart surface strain gauge comprising:
    a material having electrical resistance-changing properties, changing reversibly with tension or compression,
    wherein the material comprises an array of at least one sheet or fiber element connected to at least one other sheet or fiber element, each separate sheet or fiber element comprising one or more control points;
    at least one microcontroller, the one or more control points integrated with the at least one microcontroller, the at least one microcontroller configured to measure any change in resistance at the one or more control points, the at least one microcontroller further configured to be separately addressable;
    a power supply connected to the microcontroller; and
    a central data communication link connected to the microcontroller,
    the at least one separately addressable microcontroller configured to communicate with at least one system controller over the central data communication link,
    the said system controller configured to process data received from each microcontroller and compute the strain on part or all of the total structure, or the rate of development of fatigue of part or all of said total structure.

2. A smart surface strain gauge according to claim 1 wherein the said sheet or fiber element is formed of carbon fiber reinforced epoxy or carbon fiber reinforced epoxy matrix composite.

3. A smart surface strain gauge according to claim 2 further comprising
    a plurality of said separate carbon fiber reinforced epoxy sheets or fiber elements each comprising at least one measurement point, and the at least one microcontroller, wherein
    each of said sheets and or fiber elements being associated with the at least one microcontroller configured to perform resistance measurements, wherein said at least one microcontroller further connected to said power supply and said communication link for sending and or receiving data from said system controller, and
    said system controller being remote from the structure, and said communication link sending and receiving communications to said system controller from a wireless communications circuit.

4. A smart surface strain gauge according to claim 3 further comprising an arrangement of said carbon fiber reinforced epoxy sheets or fiber elements wherein a single sheet element further comprising:
    two of the said microcontrollers each configured to be connected to a sheet element via one or more connections respectively wherein
    each of said two microcontrollers being connected to at least one measurement point for performing resistance measurements, and
    each of said two microcontrollers being connected to said communications link via at least one connection and
    each of said two microcontrollers being connected to said power supply by at least one connection.

5. A smart surface strain gauge according to claim 2 further comprising
   a plurality of said separate carbon fiber reinforced epoxy sheets or fiber elements each comprising at least one measurement point, and said at least one microcontroller, wherein
   each of said sheets and or fiber elements being associated with the at least one microcontroller configured to perform resistance measurements, wherein said at least one microcontroller further connected to said power supply and said communication link for sending and receiving data from said system controller, and
   said system controller being integrated with the said structure and being integrated with the said power supply and the said communications link.

6. A smart surface strain gauge according to claim 5 further comprising an arrangement of said carbon fiber reinforced epoxy sheets or fiber elements wherein a single sheet element further comprising:
   two of the said microcontrollers each configured to be connected to a sheet element via one or more connections respectively wherein
   each of said two microcontrollers being connected to at least one measurement point for performing resistance measurements, and
   each of said two microcontrollers being connected to said communications link via at least one connection and
   each of said two microcontrollers being connected to said power supply by at least one connection.

7. A smart surface strain gauge according to claim 2 further comprising an arrangement of said carbon fiber reinforced epoxy sheets or fiber elements, said arrangement being integrated into the blade of a wind turbine, and wherein
   said blade sheets or blade fiber elements being organized into an arrangement of alternating arrays between the front and back outer surfaces of said blade,
   wherein each arrangement being controlled by one or more of said separately addressable microcontrollers, and
   the said at least one system controller processing the data received from said separately addressable microcontrollers.

8. A smart surface strain gauge according to claim 7 further comprising an arrangement of said carbon fiber reinforced epoxy sheets and or fiber elements wherein
   said microcontrollers are linked by a communication link and power supply, and wherein said communication link and power supply are configured to send data comprising communication of power and data signals, and wherein
said microcontrollers being linked to a radio communications circuit for communicating with the said at least one system controller via a radio link or via a fixed line link wherein,
   said system controller configured to process the received surface strain gauge data and send control signals to change the power generated by the wind turbine as a function of the measured readings, or send control signals to activate a brake to slow or stop the rotation of the wind turbine as a function of the measured readings.

9. A smart surface strain gauge according to claim 7 wherein a dynamic load on part or all of the structure causes a change in resistance of at least one of said arrangement of sheets or fiber elements and said microcontrollers measuring dynamic load data, wherein
   the two alternating sheet arrays and or fiber element arrays configured to provide data of the loading on said blade at points where the strain changing from compression to tension, wherein
   the changes in resistance determined by one array will be opposite in sense to that determined by the other, and wherein
   said resistance of each of said sheet arrays and or fiber element arrays being determined by the microcontroller configured to compute the resistance across different measurement points in said sheet or fiber element or across a plurality of said sheets or fiber elements in order to detect absolute resistance increases indicating fiber breakage and cumulative damage by at least one selected from the group consisting of: differential resistance measurement, absolute resistance measurement, and comparison resistance measurement.

10. A smart surface strain gauge according to claim 9 wherein each of said microcontrollers being configured to compare said resistance of each separate array of sheets and/or fiber elements by subtraction or ratio in a bridge circuit so that the strain-induced resistance change can be separated from temperature or other causes of resistance change.

11. A smart surface strain gauge according to claim 7 wherein
   said system controller further comprising a control algorithm using a fuzzy logic self-learning strategy as a function of at least one of the measured parameters selected from the group consisting of:
   wind speed, turbine rotational speed, tip speed ratio, temperature, variations in wind power, and wind direction.

12. A smart surface strain gauge according to claim 11 wherein said measured parameters are determined by sensors on the turbine and based, at least in part, on other operational characteristics of said turbine, wherein
   said self-learning algorithm is configured to direct its load-monitoring strategy to investigate parts of the structure most under load with higher frequency, wherein reference resistance values of said sheet arrays and or fiber element arrays determined when manufactured or at a time prior to use provide a baseline to determine the rate of development of fatigue of said structure with time, the smart surface strain gauge further comprising:
   said system controller configured to (1) determine the prevailing environmental conditions and (2) implement the optimum load-monitoring strategy in order to monitor the structure effectively.

13. A smart surface strain gauge according to claim 1 wherein said communication link and power supply is integrated with the surface of the structure.

14. A smart surface strain gauge according to claim 1 wherein fatigue of part or all of said total structure is determined by monitoring permanent changes of resistance.

15. A smart surface strain gauge according to claim 1 wherein each separately addressable microcontroller is configured to (1) monitor the stress and strain on a structure under dynamic load, (2) measure the change in resistance of each of said sheet or fiber elements in real time, and (3) compare said measurement data with stored data values.

16. A smart surface strain gauge according to claim 15 wherein said stored data values is at least one selected from the group consisting of reference data measured at time of manufacture of the structure, and reference data measured at a time before the structure is under dynamic load.

17. A smart surface strain gauge according to claim 1, wherein said system controller is further configured to monitor at least one selected from the group consisting of:
the integrity of the structure, dynamic loading of the structure, surface deformation of the structure, onset of fatigue of the structure, and a change in the surface of a pressurized structure,
and wherein said structure being at least one selected from the group consisting of:
a building, a bridge, an aircraft wing, an aircraft fuselage, an aircraft propeller, a helicopter rotor, a wind turbine structure, a wind turbine blade, a wind turbine strut, a motor vehicle body, a fuel tanker vehicle, a boat hull, a marine vessel, a ship hull, an oil tanker, a musical instrument, a support and control structure, a tool, a prosthetic joint, a prosthetic limb, a prosthetic hand, and a synthetic heart valve.

18. A smart surface strain gauge as disclosed according to claim 17 wherein the structure comprises a high surface density of resistance measurement points thereby providing a capability to capture and transmit sounds wherein the dynamically changing resistance measurements are transmitted by a communications link to an amplifier and loudspeaker where the sounds can be generated.

19. A smart surface strain gauge according to claim 17 wherein the structure is a musical instrument and the resistance measurements are linked to data related to the deformation of the instrument wherein the vibration of the said instrument can be tuned correctly, the vibration of the instrument structure, caused when a string is vibrated or when a woodwind instrument is blown, causes a deformation of the instrument body and a corresponding change in resistance in the surface strain gauge which is measured and processed by the system controller.

20. A smart surface strain gauge according to claim 19, which is further configured to be linked to:
a visible means being an arrangement of one or more selected from the group consisting of same color LEDs, changing color LEDs, and varying intensity LEDs, the said LED arrangement indicating when the resistance measurements get close to or match the signature resistance corresponding to one or more musical note frequencies for that instrument thereby providing a means to tune the said musical instrument.

21. A smart surface strain gauge according to claim 19, which is further configured to be linked to:
an audible means of varying pitch wherein, the said audible means indicating when the resistance measurements get close to or match the signature resistance corresponding to one or more musical note frequencies for that instrument thereby providing a means to tune the said musical instrument.

22. A smart surface strain gauge according to claim 1, wherein said communication link and power supply are integrated into a communication and power bus, wherein power is transmitted to the microcontrollers over the same link which carries the data.

* * * * *